No. 762,447.

Patented June 14, 1904.

UNITED STATES PATENT OFFICE.

EVERARD STEELE, OF MILL VALLEY, CALIFORNIA.

EXPLOSIVE AND METHOD OF MAKING SAME.

SPECIFICATION forming part of Letters Patent No. 762,447, dated June 14, 1904.

Application filed June 19, 1900. Renewed November 16, 1903. Serial No. 181,412. (No specimens.)

*To all whom it may concern:*

Be it known that I, EVERARD STEELE, a citizen of the United States, residing at Mill Valley, in the county of Marin and State of California, have invented certain new and useful Improvements in Explosives and Methods of Making the Same, of which the following is a specification.

My invention relates to improvements in explosives and methods of making the same, the object of my invention being to provide an explosive which shall be very powerful in its effects and which will keep for an indefinite period without deteriorating in quality.

A further object of my invention is to provide an improved method of making explosives.

In practicing my invention I take a sufficient quantity of phthalic acid, obtained by any of the well-known methods, and I nitrate the same by the addition of nitric acid. The nitrated phthalic acid or nitrophthalic acid thus obtained is reduced to a powder and is mixed with from two to four times its weight of potassium chlorate, also finely pulverized. This mixture is now moistened with a sufficient quantity of alcohol, wood-alcohol, or similar solvent, and the whole mass is agitated gently. Each particle of the nitrophthalic acid is brought to a semiliquid condition by the introduction of the alcohol, and by the agitation each particle of the potassium chlorate is inclosed with a coating of nitrophthalic acid so dissolved. The evaporation of the alcohol leaves a hard coating of nitrophthalic upon the particles of chlorate of potash, preserving them for all time against the action of moisture.

Chlorate-of-potash explosives have always heretofore been regarded as very uncertain in their action and dangerous. This is due to the hygroscopic character of chlorate of potash itself, and the fact that it is affected by changes in the humidity and temperature of the atmosphere. The absorption of moisture from the atmosphere by chlorate of potash and the subsequent evaporation of the same tend to set up chemical reactions in mixtures of which it forms an ingredient.

I make a chlorate-of-potash explosive which is safe and stable and having at the same time violent explosive force by protecting each separate grain or particle of the chlorate of potash from the action of moisture by a coating of the very ingredient which chemically reacts with the chlorate of potash explosively, said ingredient being unaffected by moisture or ordinary changes of temperature. Therefore I do not limit my invention to the specific substances nitrophthalic acid and chlorate of potash; but the essence or spirit of this feature of my invention will be complied with when an oxidizing agent in the form of a powder is mixed with an ingredient explosively reacting with the oxidizing agent and unaffected by moisture, so that the particles or grains of the oxidizing agent are individually covered with a coating of the other ingredient.

It must be understood that the nitrated phthalic acid is not dissolved bodily in alcohol or ether and then applied to the whole mass of the chlorate of potash and the volatile liquid evaporated therefrom, as this would give an entirely different result—namely, a solid mass which would have to be cut into grains—and the chlorate of potash would then be exposed and the object of the invention defeated.

I am aware that it has been proposed to impregnate gunpowder and other explosives with wax and oils; but such an explosive is entirely different from mine, since the protective material so used is a substance entirely foreign to the explosive, whereas in my invention the protective material is an ingredient of the explosive essential to the explosive action. When the particles of an explosive are coated or protected with neutral hydrocarbons, each particle is then protected by said coating not only from moisture, but from the detonating effect of the particles previously exploded. This necessarily reduces the rapidity of the explosion, and therefore its destructive effect. The explosive has to do work in vaporizing the wax or oils, which work is lost as regards useful effective results.

I claim—

1. An explosive consisting of a mechanical mixture of nitrated phthalic acid and an oxidizing agent, substantially as described.

2. An explosive comprising nitrated phthalic acid and chlorate of potash, substantially in the proportions specified.

3. An explosive consisting of grains, each of which comprise a main body portion and a complete coating, said body portion consisting exclusively of chlorate of potash and said coating consisting exclusively of an ingredient reacting explosively with the chlorate of potash, said ingredient being insoluble in water but soluble in a volatile liquid, whereby the grains of chlorate of potash are entirely protected from the action of moisture by a hardened coating of the ingredient, substantially as described.

4. An explosive consisting of grains, each of which comprises a body portion consisting exclusively of an oxidizing agent, and a complete coating consisting exclusively of an ingredient reacting explosively with the oxidizing agent, and insoluble in water but soluble in a volatile liquid, so forming a hardened coating around the grains of the oxidizing agent, substantially as described.

5. An explosive consisting of grains each comprising a body portion and a complete coating, the body portion consisting exclusively of one ingredient, and the coating exclusively of the other ingredient, said ingredients reacting chemically with violence, the latter being insoluble in water but soluble in a volatile liquid, substantially as described.

6. A process of making an explosive consisting of two ingredients which react chemically with violence, one of said ingredients being a substance insoluble in water but soluble in a volatile liquid which consists in forming the other ingredient into grains or small particles, dissolving in a volatile liquid the ingredient which is insoluble in water, coating the particles of the other ingredient with the latter ingredient so dissolved, and then evaporating the volatile liquid to leave a hardened coating of the latter ingredient on the other ingredient, substantially as described.

In witness whereof I have hereunto set my hand in the presence of two subscribing witnesses.

EVERARD STEELE.

Witnesses:
FRANCIS M. WRIGHT,
FLORENCE H. WIGAND.